UNITED STATES PATENT OFFICE.

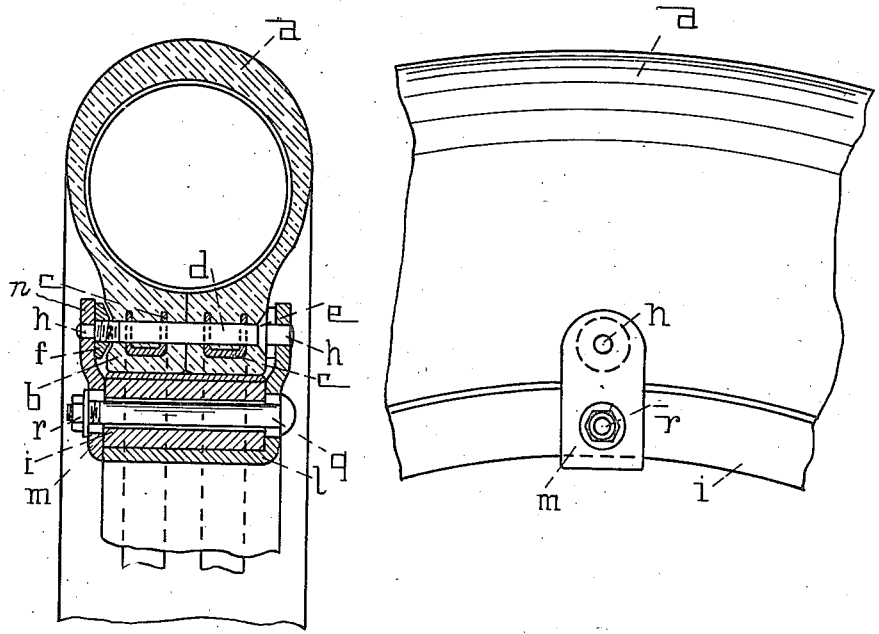

JOSEF STUNGO, OF BERLIN, GERMANY, ASSIGNOR OF ONE-HALF TO WILLIAM SCHNEIDER, OF CHARLOTTENBURG, GERMANY.

PNEUMATIC TIRE.

1,106,748.      Specification of Letters Patent.      Patented Aug. 11, 1914.

Application filed October 24, 1912. Serial No. 727,577.

*To all whom it may concern:*

Be it known that I, JOSEF STUNGO, a subject of the King of Great Britain, residing at the city of Berlin, in the Kingdom of Prussia, German Empire, have invented a new and useful Pneumatic Tire, of which the following is a specification.

This invention has reference to improvements in pneumatic tires for motor-cars and the like.

It has been usual heretofore either simply to draw a rubber cover over the air tube, or to employ, in replacing defective tires, covers mounted on removable rims or complete wheels with the covers ready mounted thereon.

In accordance with my invention the pneumatic tire forms a complete whole which can be readily drawn over the felly of the wheel and secured thereon without trouble and without employing special tools. It is no longer necessary to carry heavy reserve wheels on the car when on a journey.

The novel features of my improved tire consist in that the elastic outer cover is formed with inwardly extending thickened cheeks which are reinforced by metal rings embedded in the rubber and through which bolts are passed, the projecting ends of which are engaged by removable holders which secure the tire on the felly.

My invention consists in the combination of the thickened cheeks on the cover with the reinforcing rings within the said cheeks and the bolts which pass through the latter and the holders which engage the said bolts and secure the tire to the felly.

I have illustrated my invention in the accompanying drawing, in which:

Figure 1 shows my improved tire in section, and Fig. 2 is a side view of the same.

Referring to the said drawing: $a$ is the rubber cover which surrounds the air tube.

$b$, $b$ are inwardly projecting cheeks formed on the cover.

$c$, $c$ are metal rings which are embedded in the rubber.

Bolts $d$ formed with pin-like ends $h$, $h$ are passed through the cheeks $b$ of the metal rings, $c$, the said bolts being formed on the one side with conical shoulders $e$ and provided on the other side with conical nuts $f$ by means of which the cheeks $b$, $b$ together with the reinforcing rings $c$, $c$ are held firmly together thus inclosing the air tube in an air-tight cover or chamber. The tire described is ready to be mounted upon the felly $i$ of the wheel around which holders $l$ in the form of plates with an upwardly bent flange $n$ are mounted. The pins $h$ are engaged in holes in the outer part of the flanges $n$ and oval holes are formed in the said flanges through which bolts $g$ are passed. Small plates $m$ are mounted on the opposite side of the felly $i$ to the flanges $n$ which plates have likewise holes bored in them to receive the pins $h$ and the bolts $g$. Nuts $r$ serve for screwing up the plates $m$ and the flanges $n$ tight against the felly $i$.

The holders $l$ and the plates $m$ are mounted at suitable distances apart around the felly $i$, the pins $h$ being engaged in the holes as aforesaid and the bolts $g$ being passed through the oval holes referred to and through the felly.

The removal of the tire is equally simple: it is only necessary to unscrew the nuts $r$ far enough to release the plates $m$ from the pins $h$, when the said plates, can be swung inwardly, rotating upon the bolts $g$, leaving the tire perfectly free to be drawn off the felly.

Claim—

1. A pneumatic tire comprising an air tube, a flexible outer cover therefor having its edges thickened to form cheeks which extend inwardly and abut laterally against each other, a metal ring embedded in each cheek, bolts having reduced ends and passing through the rings and cheeks to hold the latter together, and removable flange plates mounted on the felly of the wheel and having holes to receive the reduced ends of the bolts.

2. A pneumatic tire comprising an air tube, a flexible outer cover therefor having its edges thickened to form cheeks which extend inwardly and abut laterally against each other, a metal ring, U-shaped in cross section, embedded in each cheek, bolts having reduced ends and passing through the rings and cheeks to hold the latter together, and removable flange plates mounted on the felly of the wheel and having holes to receive the reduced ends of the bolts.

3. A pneumatic tire comprising an air tube, a flexible outer cover therefor having thickened edges to form cheeks which extend inwardly and abut laterally against each other, a metal ring U-shaped in cross-section embedded in each cheek, bolts having reduced ends passing through the rings and cheeks, a conical shoulder and a conical nut on each bolt to hold the cheeks together, removable flange plates mounted on the felly of the wheel and having holes into which the reduced ends of the bolts project.

In testimony whereof I have signed my name to this specification in the presence of two subscribing witnesses.

JOSEF STUNGO.

Witnesses:
 HENRY HASPER,
 WOLDEMAR HAUPT.